United States Patent [19]
Meri

[11] 3,716,673
[45] Feb. 13, 1973

[54] ANSWERING MACHINE TELEPHONE LINE COUPLING DEVICE

[75] Inventor: Kalju Meri, Maspeth, N.Y.

[73] Assignee: Electrospace Corporation, North Bergen, N.J.

[22] Filed: Nov. 29, 1971

[21] Appl. No.: 202,791

[52] U.S. Cl. ....................179/6 R, 179/1 SW, 179/1 C
[51] Int. Cl. ....................H04m 1/64
[58] Field of Search..179/6 R, 6 AC, 1 SW, 1 C, 2 C, 179/2 A, 2 DP, 84 R, 84 A

[56] References Cited

UNITED STATES PATENTS

| | | | |
|---|---|---|---|
| 2,147,820 | 2/1939 | Milde | 179/6 R |
| 2,883,461 | 4/1959 | Cain | 179/6 R |
| 3,485,952 | 12/1969 | Walker | 179/2 A |
| 3,548,102 | 12/1970 | Leverkusen et al. | 179/2 A |

FOREIGN PATENTS OR APPLICATIONS

| | | | |
|---|---|---|---|
| 974,621 | 11/1964 | Great Britain | 179/6 R |

*Primary Examiner*—Raymond F. Cardillo, Jr.
*Attorney*—Abraham Friedman et al.

[57] ABSTRACT

A device connected between a telephone line and its associated local telephone for coupling an answering or recording machine therebetween. The device includes a voltage sensing member connected in series between one standard circuitry terminal of the telephone line and its associated local telephone terminal to prohibit the transmission of voice or other audible communications from the local telephone when a telephone call is made thereto. The device also includes a ringing sensor connected to the telephone line for activating the answering machine, and a coupling switch which is moved into a closed position by the energizing of the answering machine to close the telephone line circuit loop. A line transformer is disposed in series with the coupling switch to provide a signal path to the answering machine for the recording of information from the telephone line when the coupling switch is closed. A branch line is preferably disposed in series with the associated telephone terminals and in a parallel arrangement with the voltage sensing member to permit reception of audible signals or communications from the receiver of the local telephone.

9 Claims, 1 Drawing Figure

PATENTED FEB 13 1973 3,716,673
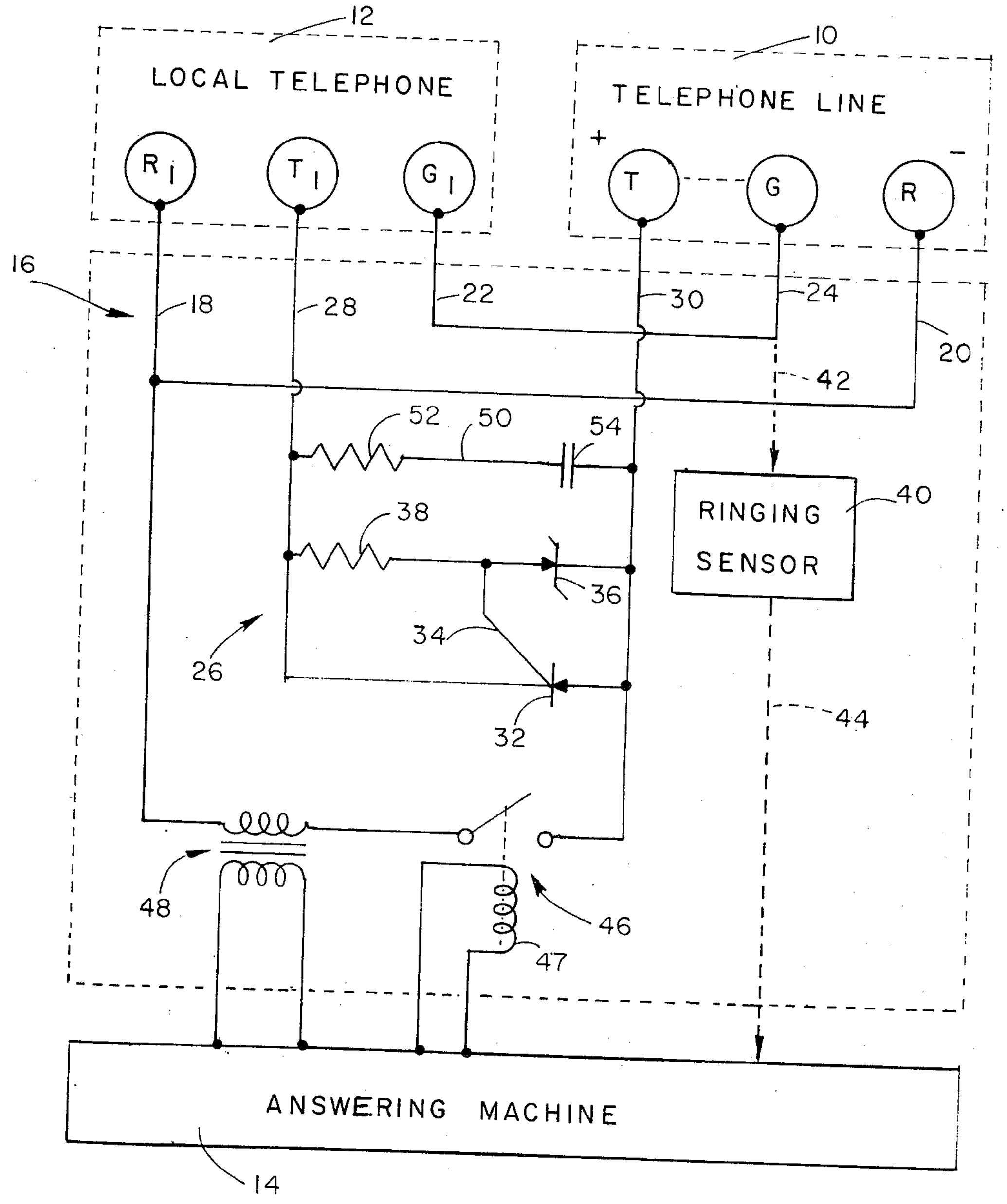
KALJU MERI
INVENTOR
BY Friedman + Goodman
ATTORNEYS

ANSWERING MACHINE TELEPHONE LINE COUPLING DEVICE

BACKGROUND OF THE INVENTION

This invention relates to a coupling device, and more particularly relates to a device for coupling an answering or recording machine between a telephone line and its associated local telephone in such a manner as to prohibit the transmission of voice or other audible communications from the local telephone when a telephone call is made thereto.

Telephone answering or recording machines are well known in the art, wherein these answering machines may either be connected directly to the local telephone or connected between the local telephone and the telephone line. When these answering machines of the prior art are functioning, the local telephone can usually be used to transmit voice or other audible communications in addition to receiving communications so that the entire phone conversations between the parties can be recorded by the answering machines.

Many states have passed laws requiring that such answering machines transmit a bleep or sound at regular intervals to inform both the party initiating the call and the party receiving the call that the conversation is being recorded. These bleeps or sounds are required only when there is a two-sided conversation between the party initiating the call and the party receiving the call. However, there are many situations in which there is actually no requirement for a two-sided conversation, where only the party initiating the telephone call transmits a communication to the receiving party with no need for the receiving party to answer. In this situation, the bleeps or sounds are an annoyance and may tend to delete or override part of caller's communication.

In other situations, telephones in present day use may transmit large quantities of data and other information from a first station to a second station for recording, wherein the second station is just a receiving station and does not reply in any manner to the first station. In this latter situation, the required bleeps or sounds would destroy parts of the data transmitted from the first station and is a definite disadvantage.

Telephones are also used to transmit pictures by sending signals of different sound frequencies over the telephone lines. Any required bleeps or sounds would tend to distort the transmitted signals and therefore the received picture, thereby creating a definite problem if the sound frequencies of these transmitted pictures are desired to be recorded by the party receiving the signals.

SUMMARY OF THE INVENTION

To overcome the disadvantages of the prior art set forth above, the present invention comprises a device for coupling an answering or recording machine to telephone circuitry to prohibit transmission of voice or other audible communications from a standard local telephone which has received a call thereon. The device includes voltage sensing means connected in series between one standard circuitry terminal of a telephone line and its associated local telephone terminal to prohibit the voice communication from the local telephone, a ringing sensor connected between standard circuitry terminals of the telephone line for activating the answering or recording machine, a coupling switch for closing the telephone line circuit loop when the answering machine is activated, and a line transformer in series with the coupling switch to provide a signal path to the answering or recording machine for recording information from the telephone line. Preferably, an additional electrical line including a resistor in series with a capacitor is disposed in series with the associated telephone terminals and in a parallel arrangement with the voltage sensing means to permit reception of audible signals from the standard telephone receiver of the local telephone receiving the telephone call.

Accordingly, it is a principal object of the present invention to provide a coupling device for an answering or recording machine that overcomes the disadvantages of the prior art.

Another object of the present invention is to provide voltage sensing means that prohibit voice or other audible communications from a transmitter of a standard local telephone.

Yet another object of the present invention is to provide a coupling device for an answering or recording machine that permits reception of audible signals or communications from the receiver of a standard local telephone while prohibiting voice or other audible communications to be transmitted from this same local telephone.

A further object of this invention is to provide a coupling device for a recording or answering machine that may be used under laws now present in many states of the United States, without requirement of transmitting a bleep or sound at regular intervals.

A still further object of the present invention is to provide an easily constructed coupling device with low-cost circuitry which permits an answering or recording machine to be connected to telephone circuitry for the purpose of preventing voice or other audible communications from being transmitted from a standard local telephone which has just received a call.

An added object of the present invention is to provide a coupling device that combines all the above mentioned features with extreme economy and reliability.

BRIEF DESCRIPTION OF THE DRAWING

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it, when read in conjunction with the accompanying drawing in which:

The FIGURE shown in the drawing is a schematic diagram, partially in block form, illustrating parts and circuitry of the present invention, showing the voltage sensing means of the coupling device of this invention.

DESCRIPTION OF THE PREFERRED EMBODIMENT

In order that the invention be disclosed in a clear and concise manner, the disclosure has been simplified to some extent by omitting telephone circuitry and answering or recording machine equipment of conventional design which are well known in the art. Consequently, only those portions of such prior art apparatus necessary for an understanding of the present invention will be described hereinafter below. The various components of the conventional telephone circuitry pursuant to the present invention such as a telephone line 10 and a local telephone 12 having a conventional receiver, a conventional transmitter, a conventional ringer assembly, a conventional dial assembly, and a conventional hook-up of the circuitry, are well known in the prior art and need not be further described, such also being true with the conventional circuitry of well-known answering or recording machines 14.

Referring now to the single FIGURE of the drawing in detail, there is illustrated in diagrammatic block form a conventional telephone line 10 provided with its three conventional terminals T, G and R as commercially indicated, wherein terminal T is positive and terminal R is negative. Also shown in diagrammatic block form is a conventional local telephone 12 provided with its three conventional hook-up terminals $R_1$, $T_1$ and $G_1$ as commercially indicated, wherein for a conventional hook-up of the local telephone 12 to the telephone line 10, terminal T is connected to its associated terminal $T_1$, terminal G is connected to its associated terminal $G_1$ and terminal R is connected to its associated terminal $R_1$.

The coupling device of the present invention, designated by numeral 16, is employed to connect the terminals of the telephone line 10 to the terminals of the local telephone 12, wherein terminal $R_1$ is directly connected to terminal R by lines 18 and 20, respectively, of the coupling device 16, terminal $G_1$ is connected directly to terminal G by lines 22 and 24, respectively, of the coupling device 16. The connection between terminal $T_1$ and terminal T will be set forth in fuller detail hereinafter below.

Referring to the circuitry of the coupling device 16, there is illustrated in diagrammatic fashion a voltage sensing member or device 26, constructed in accordance with the principle of the present invention, connected in series with terminal $T_1$ and terminal T by lines 28 and 30, respectively. The voltage sensing device 26 comprises an avalanche type switch 32 (e.g. a silicon controlled rectifier) having a gating element 34 which is connected in series with a 20 volt zener diode 36. A resistor 38, preferably having a value of approximately 1,000 ohms, is connected in series between the anode of the zener diode 36 and the telephone terminal $T_1$. The resistor 38 is a bleeder resistor whose purpose is to prevent any transient surges from being impacted to the gate 34, thereby preventing any false triggering of the switch 32.

Initially, as standard in telephone lines, there is a voltage of 48 volts across the telephone terminals T and $T_1$, and therefore 48 volts across the lines 30 and 28 of the coupling device 16 which are connected thereto, respectively. The local telephone 12 is connected in series with the line 28, while the electronic avalanche switch 32 is connected in series with both the telephone line 10 by the coupler line 30 and the local telephone 12 by the coupler line 28. In turn, the zener diode 36 is in series with the coupler line 30 and the gating element 34 of the electronic avalanche switch 32.

When the conventional handset of the local telephone 12 is in a rest or nonuse position on its cradle, the series connection between terminal T and $T_1$ is in an open condition and, as indicated above, there is a static voltage of 48 volts across the telephone lines. When the conventional handset is raised off the local telephone set, the series connection is closed and due to the presence of 48 volts static voltage, there is sufficient voltage to fire the 20 volt zener diode 36, which in turn gates (via gating element 34) the electronic avalanche switch 32 into conduction resulting in the closure of the telephone line circuit loop with the telephone circuitry, wherein the connection between terminals T and $T_1$ are now in a closed position through the now closed switch 32.

Accordingly, with the closure of the circuit loop via switch 32, the voltage across terminals T and $T_1$ drops to approximately 5 volts, as is standard in conventional telephone circuitry. However, the avalanche switch 32, once gated, closes and still continues to conduct with the lower voltage of 5 voltages impressed thereacross. Therefore, a party may easily initiate a telephone call on local telephone 12 in a manner similar to that normally used without the coupler devices 16. The receiving of a telephone call on local telephone 12 will now be discussed below.

As shown in the drawing, the coupling device 16 includes a ringing sensor 40, of conventional type well known in the art. The ringing sensor 40 is connected by conventional means, shown by broken lines 42, to the terminals of telephone line 10, preferably through lines 20 and 24 of the coupling device 10, though other conventional connections may obviously be used. The ringing sensor 40 is connected in such a manner as to ring at the same moment as the ringing of the conventional ringer assembly of the local telephone 12, being hooked up in a parallel arrangement therewith by the suitable means well known in the art mentioned above. The ringing sensor 40 is additionally associated with suitable circuitry of the answering machine 14 in a conventional manner so that the answering machine is automatically activated on the first ring of the ringing sensor 40. The conventional connection, shown by broken lines 44 between the ringing sensor 40 and the answering machine 14, can be made either electrically using conventional wiring, or made electronically depending upon the particular requirements of the answering machine, both methods being well known in the art.

The coupling device 16 includes a coupler switch 46 associated with a conventional relay coil 47 which is activated by the answering machine 14, the coupler switch 46 being connected in series with telephone terminal T by line 30 and individually with both telephone line terminal R by line 20 and local telephone terminal $R_1$ by line 18. The coupler switch 46 is normally in an opened position, as shown in the drawing, whereby activation of the answering machine 14 by the ringing sensor 40 causes conventional circuitry in the answering machine 14 to energize relay coil 47 to close the switch 46, thereby closing the circuitry loop between the telephone line terminals T and R. A conventional line transformer 48 is disposed in series with the coupling switch 46. The line transformer 48 is connected by conventional means to the answering machine 14 to provide a signal path to the answering machine for the recording of information from the telephone line 10 when the coupling switch 46 is closed. Accordingly, with the arrangement as shown above, a person desiring to record vocal or other audible communications being received at local telephone 12, need only place the power switch (not shown) of the answering machine 14 in an on position prior to receiving a telephone call. When the local telephone 12 receives a call, indicated by the ringing of its bell or ringing assembly, the ringing sensor 40 will automatically activate the answering machine 14 upon the first ring. The answering machine 14 upon activation, will automatically close switch 46 which closes the telephone line circuit loop in the same manner as lifting the handset of a telephone off its cradle when answering a call. When the telephone line circuit loop is in a closed condition, the static voltage of 48 volts between terminals T and T1 mentioned above, drops to approximately 5 volts as usual in conventional telephone circuitry. The coupler switch 46 remains in a closed position for the duration of the operating interval of the answering machine 14. The line transformer 48 provides the signal path for the recording of information by the answering machine 14 during the above-mentioned operating interval. The operating interval of the answering machine 14 is determined by conventional means well known in the art, and requires no further discussion for the purpose of understanding the present invention.

If during the above-mentioned recording, a person lifts the handset of the local telephone 12 from its cradle, the person will be prohibited or prevented from making any voice or other audible communications from the local telephone 12. The reason for this restriction is because the voltage across terminals T and $T_1$ is now approximately 5 volts as stated above, which 5 volts of voltage is insufficient to fire the 20 volt zener diode 36 so that the avalanche switch remains in an opened position and does not conduct, whereby the circuit between terminals T and $T_1$ remains in an open condition.

Once the above-mentioned operating interval of the answering machine 14 is concluded, the coupler switch 46 will return to its opened position. Therefore, the coupling device 16 is immediately restored to its normal state, wherein the above arrangement is again ready to receive and record another call in the same manner as mentioned above.

It is noted, that if the party receiving the local telephone 12 does not desire to record, the party need only turn the power switch of the answering machine to an off position so that the answering machine 14 is not activated by the ringing sensor 40. Thus, with the power switch off, when the handset of the local telephone 12 is lifted from its cradle when receiving a telephone call, there is a sufficient voltage of 48 volts to fire the 20 volt zener diode 36, which in turn gates the avalanche switch 32 and brings the telephone line circuit loop into operation by closing same. The avalanche switch 32 once gated closed, continues to conduct with the lower voltage of 5 volts impressed thereacross as mentioned above, so that the parties may carry on a conventional telephone conversation. It is noted that the coupler switch 46 remains in an open position during the above procedure with the power switch off.

Preferably, the coupling device 16 of the present invention includes circuitry to permit a person to listen to the voice or other audible communications being received by the local telephone 12. A branch line 50 is connected in series with telephone line terminal T and local telephone terminal $T_1$ by coupler lines 30 and 28, respectively, the line 50 being disposed in a parallel arrangement with the voltage sensing device 26. Branch line 50 includes a resistor 52, preferably having a value of approximately 100 ohms, and a capacitor 54, preferably having a value of approximately 0.1 microfarad.

Accordingly, branch line 50 can conduct only A.C. current, which A.C. current corresponds to the standard audible signal normally received by local telephone 12. However, branch line 50 does not conduct any D.C. current. Because D.C. current would be required to operate the conventional telephone handset carbon microphone, no voice or other audible communications can be transmitted from local telephone 12, thereby supporting the electrical arrangement of the coupling device 16 mentioned above.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. A device connectable between a telephone line and its associated local telephone for coupling an answering machine between said telephone line and said local telephone, said device including ringing sensor means associated with said telephone line for activating said answering machine, switch means associated with said answering machine for closing a telephone line circuit loop when said answering machine is activated, transformer means connected to said switch means and associated with said answering machine to provide a signal path to said answering machine for recording information from said telephone line, and voltage sensing means connected between one circuitry terminal of said telephone line and its associated local telephone terminal to prohibit transmission of audible communication from said local telephone after said telephone line circuit loop is closed by said switch means, said voltage sensing means permitting transmission of audible communication from said local telephone when said switch means is in an open condition.

2. A device according to claim 1, wherein line means are connected in series between said telephone line terminal and said local telephone terminal to permit reception of audible signals at said local telephone when said telephone line circuit loop is closed by said switch means.

3. A device according to claim 2, wherein said line means include a resistor in series with a capacitor, said capacitor being disposed in a parallel arrangement with said voltage sensing means.

4. A device according to claim 1, wherein a first static voltage is impressed across said telephone line when said local telephone is in an inactivated condition, said first static voltage changing to a second static voltage whose magnitude is less then said first static voltage when said telephone line circuit loop is closed, said voltage sensing means including a zener diode requiring a predetermined voltage to fire, said predetermined voltage being lower than said first voltage and higher than said second voltage.

5. A device according to claim 4, wherein said voltage sensing means includes an electronic avalanche switch connected in series between said telephone line terminal and said local telephone terminal, said electronic avalanche switch being associated with said zener diode to close a circuit between said telephone line terminal and said local telephone terminal when said zener diode is caused to fire for permitting transmission of audible communication from said local telephone.

6. A device according to claim 5, wherein said voltage sensing means includes resistor means associated with said electronic avalanche switch for preventing any false triggering of said electronic avalanche switch.

7. A device according to claim 5, wherein said electronic avalanche switch comprises a silicon controlled rectifier provided with a gating element, said zener diode being connected in series between said telephone line terminal and said gating element.

8. A device according to claim 7, wherein said voltage sensing means includes a bleeder resistor connected in series between said zener diode and said local telephone terminal to prevent any transient surges from being imparted to said gating element for preventing any false triggering of said electronic avalanche switch.

9. A device according to claim 8, wherein line means are connected in series between said telephone line terminal and said local telephone terminal to permit reception of audible signals at said local telephone when said telephone line circuit loop is closed by said switch means.

* * * * *